United States Patent [19]

Thomas et al.

[11] 4,157,254

[45] Jun. 5, 1979

[54] METHOD AND APPARATUS FOR BENDING GLASS SHEETS TO CURVED V-BENDS

[75] Inventors: Dean L. Thomas, Glenshaw; Thomas J. Reese, Sarver, both of Pa.

[73] Assignee: PPG Industries, Inc., Pittsburgh, Pa.

[21] Appl. No.: 892,626

[22] Filed: Apr. 3, 1978

[51] Int. Cl.² ................................................ C03B 23/02
[52] U.S. Cl. ................................. 65/273; 65/103; 65/106; 65/288; 65/DIG. 4
[58] Field of Search ............... 65/103, 104, 106, 107, 65/273, 275, 288, DIG. 4, 40

[56] References Cited

U.S. PATENT DOCUMENTS

| 3,253,898 | 5/1966 | Leflet, Jr. ................... 65/107 X |
| 3,762,903 | 10/1973 | Hamilton ........................ 65/107 |
| 3,762,904 | 10/1973 | Hamilton et al. ............... 65/107 |
| 3,795,501 | 3/1974 | Jansson et al. ................ 65/106 |
| 3,795,570 | 3/1974 | Jansson et al. ................ 161/125 |
| 3,847,586 | 11/1974 | Reese et al. ................... 65/290 |
| 3,865,680 | 2/1975 | Reese et al. ............... 65/107 X |
| 3,879,184 | 4/1975 | Hamilton et al. ............... 65/107 |
| 3,880,636 | 4/1975 | Tobin et al. ..................... 65/107 |
| 4,047,916 | 9/1977 | Reese et al. .................... 65/106 |
| 4,066,429 | 1/1978 | Reese et al. .................... 65/107 |

*Primary Examiner*—Arthur D. Kellogg
*Attorney, Agent, or Firm*—Dennis G. Millman; Edward I. Mates

[57] ABSTRACT

This invention relates to a method and apparatus for shaping glass sheets to V-bends along a curved line of bending.

4 Claims, 5 Drawing Figures

METHOD AND APPARATUS FOR BENDING GLASS SHEETS TO CURVED V-BENDS

BACKGROUND OF THE INVENTION

This invention relates to bending glass sheets and particularly to bending glass sheets to sharp or V-bends in which the line of bending is curved. By way of definition for the sake of this disclosure, a sharp bend is defined as one in which the radius of bend does not exceed 8 inches (approximately 20 cm.).

Glass sheets have been bent by the sag bending method by mounting one or more glass sheets on an outline metal mold of the skeleton type having a curvature in elevation and an outline configuration conforming to the shape desired for the glass sheet or sheets after bending. The mold laden with one or more glass sheets is introduced into a furnace where the glass sheets are heated to the glass deformation temperature and sag to conform to the upper surface of the mold. Glass sheets have also been bent to sharp curvatures by combining the overall heat in an enclosed furnace with localized heat applied along one or more lines to be sharply bent. This localized heat radiates either from an elongated heating element closely spaced to each line of sharp bending of the glass or from one or more lines of electroconductive material applied to the glass surface along each line of sharp bending.

In the past, the lines of sharp bending have been limited to straight lines. Recently, automobile stylists have requested that glass sheets be provided for possible use in future models of automobiles of advanced design. The design requires a glass sheet bent about an elongated curved axis of bending so as to be incorporated in a highly styled automobile of the future where the curved line of bending of the glass merges into a curved line of bending between a roof and a side portion of the automobile body. Apparatus available in the prior art is not capable of bending glass sheets into such shapes.

DESCRIPTION OF THE PRIOR ART

In recent years, several patents have issued relating to the bending of glass sheets to sharp curvatures, more commonly called V-bends. U.S. Pat. No. 3,762,903 to Harold E. Hamilton; U.S. Pat. No. 3,762,904 to Harold E. Hamilton, Robert E. Bamford and Paul Pastorek; U.S. Pat. No. 3,879,184 to Harold E. Hamilton and Ivan L. Soreghy; and U.S. Pat. No. 3,865,680 to Thomas J. Reese and Harry S. Koontz disclose glass bending methods and apparatus employing lines of electroconductive material that are applied directly to the glass surface to form a sharp line of bending along a straight line.

U.S. Pat. No. 3,795,501 to Robert A. Jansson and Thomas J. Reese; U.S. Pat. No. 3,795,570 to Robert A. Jansson and Dean L. Thomas; and U.S. Pat. No. 3,847,586 to Thomas J. Reese, George R. Claassen, and Melvin W. Tobin disclose outline bending molds of metal that incorporate flexible metal ribbons in insulated relation to the metal molds. The flexible metal ribbons are used as auxiliary heating elements that augment the heating of glass sheets along elongated straight lines of sharp curvature. U.S. Pat. No. 3,880,636 to Melvin W. Tobin and Thomas J. Reese and U.S. Pat. No. 4,066,429 to Thomas J. Reese, Melvin W. Tobin and James R. Mortimer disclose outline bending molds provided with electrically insulated heating ribbons of non-uniform electroconductivity per unit length to provide straight lines of bending of non-uniform radius of curvature.

U.S. Pat. No. 4,047,916 to Thomas J. Reese, James R. Mortimer, Melvin W. Tobin and Stephen J. D. Jursa discloses outline bending molds having electroconductive heating ribbons that are weighted to be supported in tension in facing relation to a sharp line of bending of a glass sheet. The tension provided by the weights attached to the ribbon causes the ribbon to be tensioned along a straight line which faces the straight line of bending desired in a glass sheet.

None of the references or any patents in the glass bending field of which we are aware disclose the concept of bending glass sheets to sharp curvatures along curved lines of bending.

SUMMARY OF THE INVENTION

According to the present invention, a special glass sheet bending mold of outline metal rail construction capable of bending a glass sheet sharply about a curved line of sharp bending has been developed. This mold incorporates a heating ribbon of electroconductive material that is supported in electrically insulated relationship to the metal rail or rails that comprise the outline mold and is held in tension by weights but is supported intermediate its ends on a plurality of insulator guides disposed along a curved line facing a surface of the glass sheet to be bent along a curved line of sharp bending. Special means is provided for holding the elongated ribbon in tension in closely spaced relation to the plurality of insulator guides disposed along the curved line so that the tensioned ribbon is longitudinally curved to face an elongated curved line of sharp bending to be imparted along a dimension of a glass sheet. The insulator guides are preferably composed of sectionalized ceramic spools comprising an intermediate ceramic roller of relatively small diameter flanked by larger diameter ceramic rollers and a special ribbon supporting element is provided for each ribbon supporting insulator guide. Preferably, U-shaped wire is wrapped around the circumference of the relatively small diameter ceramic roller in such a manner that the closed end of the U slidably supports the ribbon in closely spaced relation to the roller about which the U-shaped wire is wrapped. The wire is flexible enough to wrap around the roller so that its closed end is closely adjacent thereto and yet is sufficiently rigid after it is bent around the roller to maintain a slidable support for the ribbon between each roller and the closed end of the U-shaped wire.

According to a method of making a bent and tempered glass sheet having a sharp line of bending that is curved, a flat glass sheet is supported on an edgewise disposed outline metal rail that forms an outline mold and a support structure containing the plurality of insulator guides disposed along a curved line is used to support an electroconductive ribbon along a curved line conforming to the curved line of bending desired in closely spaced relation to a surface of the glass sheet. While the specific embodiment illustrated supports the curved ribbon above the glass sheet, it is understood that the ribbon may also be employed in facing relation to the lower surface of the glass sheet if desired. The glass laden mold is heated to a temperature approaching the softening point of the glass and at an appropriate moment in the heating cycle, additional heat is supplied through the elongated ribbon along a curved line of sharp bending that faces the line of bending desired for the glass sheet. The glass sheet sags by gravity so that its outline conforms to the outline of the outline shaping surface of the metal mold rail while the line of the glass sheet that faces the curved elongated ribbon sags below the level of the remainder of the glass sheet along a curved line of sharp bending to provide a shape conforming in elevational contour in outline to the shape desired for the glass sheet. After the sheet is bent to the desired curvature, it is immediately removed from the hot atmosphere where it is shaped, and, while still mounted on the mold, is transported to a quenching position between upper and lower nozzles where air or other tempering medium is applied against the upper and lower surfaces of the glass at a relatively cold temperature sufficiently rapidly to cause the glass sheet to develop a stress profile which is associated with tempered glass.

These and other benefits of the present invention will be understood more clearly in the light of a description of a specific embodiment of this invention which is described in the subject matter that follows.

It is understood that while the specific embodiment disclosed relates to a mold having a flexible electroconductive ribbon constrained to be supported along a substantially curved line conforming to the curved line of sharp bending to be imparted to the glass sheet, that the present invention also contemplates bending a glass sheet to a sharp curvature along a curved line of bending by applying electroconductive material directly to one or both of the glass sheet surfaces along the curved line of sharp bending desired and applying voltage to the electroconductive material after overall heating of the glass to at least its strain point as an alternative method of obtaining the sharp line of bending in conjunction with the usual bending and tempering operation performed with the specific illustrative embodiment.

BRIEF DESCRIPTION OF THE DRAWINGS

In the drawings that form part of the description of an illustrative embodiment and wherein like reference numbers refer to like structural elements.

DESCRIPTION OF THE PREFERRED EMBODIMENTS

Figure 1:
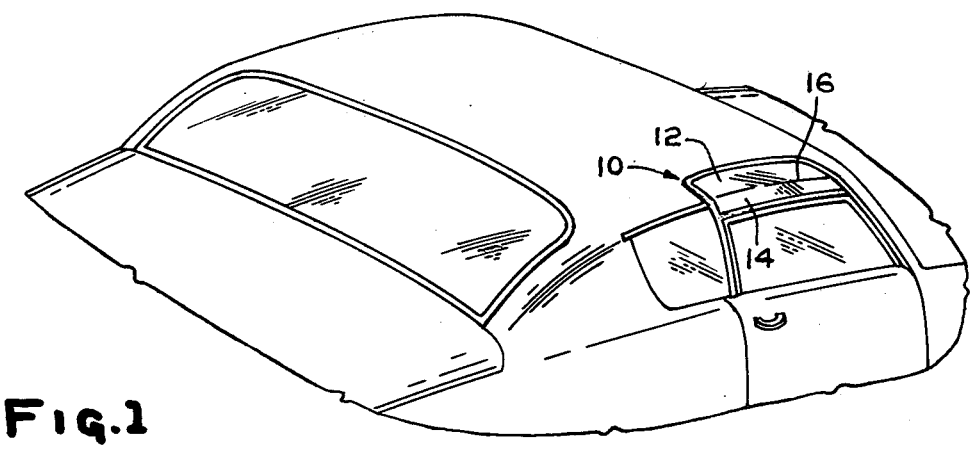
FIG. 1 is a perspective view of a portion of an automobile showing a glass sheet shaped sharply about a curved line of bending installed above a door opening of an automobile.
Figure 2:
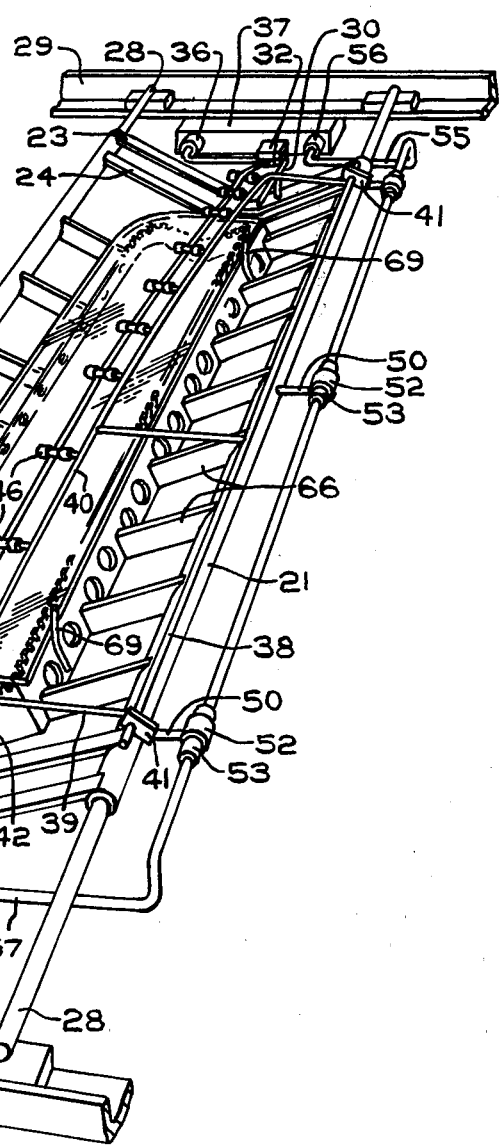
FIG. 2 is a perspective view of a mold for bending glass sheets showing the mold supporting a flat glass sheet for bending.
Figure 3:
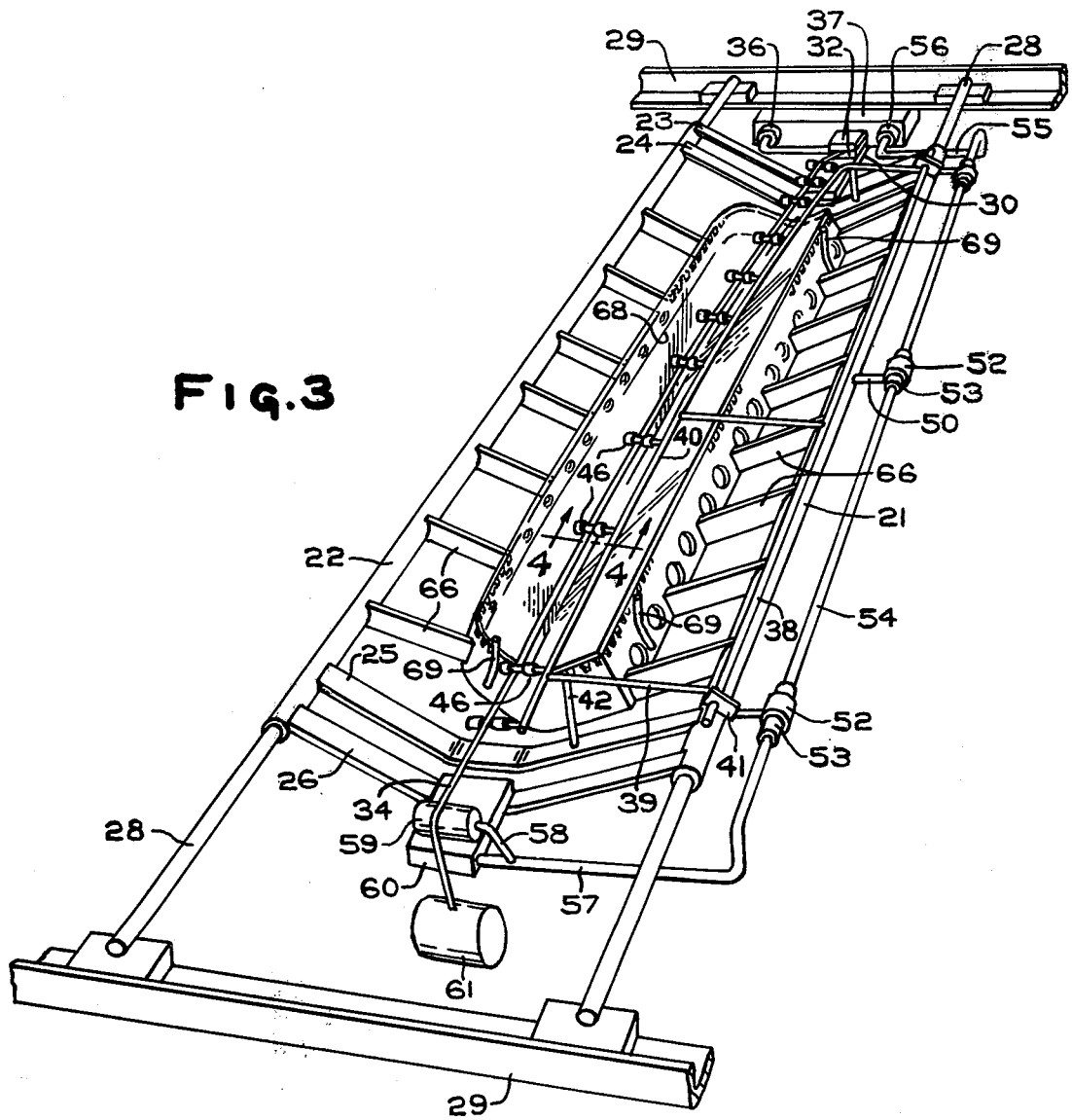
FIG. 3 is a view similar to FIG. 2 showing the mold supporting the glass sheet after bending it to a shape that includes a curved line of sharp bending.
Figures 4, 5:
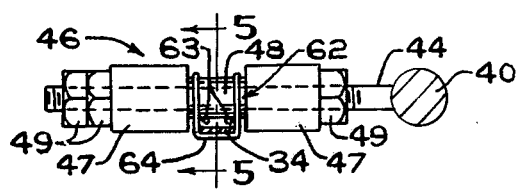
FIG. 4 is a sectional view taken along the line 4—4 of FIG. 3 showing how an insulator guide is mounted relative to the mold and how a flexible elongated ribbon of electroconductive material is slidably supported by a U-shaped wire in close adjacency to the mold insulator guide.
FIG. 5 is a cross-sectional view taken along the lines 5—5 of the insulator guide of FIG. 4.

FIG. 1 shows a curved window 10 mounted in an automobile frame. The window comprises an upper roof portion 12 that merges into the roof and a lower sloping portion 14 that merges into the side of the vehicle. A curved line of bending 16 sharply distinguishes the upper roof portion 12 from the lower sloping portion 14 of the curved window 10. The curved line of bending 16 in the bent glass sheet conforms to the curved line where the roof merges into the side of the vehicle body.

In order to fabricate a window such as depicted in FIG. 1, a special mold generally of the outline gravity sag type is used in combination with conventional bending furnace elements similar to those that are conventionally used for producing the straight V-line bends of the prior art.

The mold conforming to the present invention is supported by a support frame comprising a pair of longitudinally extending tubes 21 and 22 interconnected by a pair of trusses 23 and 24 near one end and by another pair of trusses 25 and 26 near the other end. Extensions 28 are provided at each end of each tube to rest on the cross bars 29 of a mold supporting carriage (broken away) that conveys the mold through a bending and tempering apparatus.

The end truss 23 supports an insulator block 30 which extends longitudinally outward therefrom and supports a pair of metal clamping plates 32 which are interconnected by a nut and bolt arrangement so that they can clamp one end of a longitudinally curved electroconductive ribbon 34 therebetween. The pair of metal plates 32 is electrically connected to a first electrode 36. The first electrode 36 is received in an insulated terminal box 37.

A frame comprising an elongated rod 38, a pair of end members 39 and an interconnecting longitudinal member 40 is pivotally supported relative to bearing plates 41 carried by longitudinally extending tube 21. A stub rod 42 extends downward from each end member 39 to rest on the upper surface of the inner trusses 24 and 25 of the respective pairs of trusses at each end of the mold.

Along the length of the interconnecting longitudinal member 40, a plurality of externally threaded rods 44 extend away from the pivotally supported longitudinal member 40. An insulator guide 46 in the form of a multi-section ceramic spool having a pair of relatively large diameter ceramic rollers 47 flanking one or more relatively small diameter intermediate ceramic rollers 48, is rotatably supported about each externally threaded rod. Lock nuts 49 are provided at each end of each insulator guide 46 to control the position of its small diameter ceramic roller 48 along the length of the externally threaded rod 44 so that each small diameter ceramic roller 48 is mounted along a curved line conforming to the curvature of a line of sharp bending that is to be imparted to a glass sheet mounted on a mold connected to and supported by the tubes 21 and 22.

The longitudinally extending tube 21 adjacent the frame supports a plurality of metal support rods 50 that extend laterally outwardly therefrom. A metal sleeve 52 is fixed to the outer end of each metal support rod 50. Each metal sleeve 52 surrounds a ceramic bushing 53 of electrical insulation material. An electroconductive rod 54 having an end extension 55 leading to a second electrode 56 extends through the ceramic bushings 53 and terminates at its other end in a cross rod extension 57 that supports an upwardly extending electroconductive arm 58 that is electrically connected to a roller electrode 59 at its end opposite the connection between rod extension 57 and the second electrode 56.

The end of rod extension 57 is supported by an insulator block 60, which also supports the roller electrode 59. Insulator blocks 30 and 60 insulate the rod extensions 55 and 57 from the metal construction of the mold. Truss 26 supports insulator block 60.

The second electrode 56 is connected to the terminal box 37. The latter can be engaged by probes (not shown) that extend through openings in the wall of a bending furnace and are connected to a variable voltage source (not shown). In this manner, when the probes are extended to engage the electrodes 36 and 56 within terminal box 37, a potential difference is applied between the electrodes 36 and 56 to cause current to pass from electrode 36 and clamping plates 32 to ribbon 34 and thence to electrode 56 by roller electrode 59, electroconductive arm 58, cross rod extension 57, electroconductive rod 54 and end extension 55.

The electroconductive ribbon 34 clamped near one end to the clamping plates 32 is supported over the first and last insulator guides 46 and under the intermediate insulator guides 46. A weight 61 is attached to the other end of the electroconductive ribbon 34. The weight 61 tensions the ribbon which is mounted over the roller electrode 59. Since the insulator guides 46 have their small diameter rollers 48 arranged along a curved line, the curved flexible, electroconductive ribbon 34 is tensioned along a curved line.

A wire loop 62 of U-shaped configuration is wrapped around the small diameter central roller 48 of each intermediate insulator guide 46 and has a pair of free ends 63 extending circumferentially in parallel relation to one another around the roller 48 away from a closed end 64. The looped portion of each wire loop 62 holds the flexible ribbon 34 in closely spaced relation to the central ceramic roller 48 of each insulator guide 46 and allows some relative sliding. The wire loops 62 turn in response to a pull on the flexible metal ribbon 34 to help the metal ribbon remain tight and to extend along a curved line defined by the insulator guides.

Several connecting bars 66 extend laterally inward from each of the longitudinally extending tubes 21 and 22, to which the outer ends of said bars are connected. The inner end of the connecting bars 66 are fixed to the outer surface of a metal shaping rail 68 of outline configuration disposed edgewise to conform in outline plan contour and elevational curvature to the shape desired for a mold to which a glass sheet is sagged to have its peripheral portion conform. Side and end stops 69 are located along one side and adjacent one end of the mold rail 68. The frame is so arranged relative to the area enclosed by the mold rail 68 that the electroconductive ribbon 34 extends along a curved path that conforms to the curved shape desired for the glass sheet to be bent and faces the portion of the glass that is desired to be bent sharply along a curved line of bending.

The insulator guides 46 may be spaced apart non-uniformly depending on the severity of curve defined by the succession of guides along the length of the mold defined by the outline metal mold rail 68. The spacing between adjacent insulator guides 46 should be sufficiently small to prevent the ribbon from sagging into contact with the glass sheet between adjacent insulator guides that support the curved flexible ribbon. Contact between the ribbon and the glass should be avoided in order to avoid marking of the heat-softened glass along the line of sharp bending. Spacings of 2 inches (5 cm) to 5 inches (12.7 cm) have been used successfully on a mold that produced feasibility samples. Closer spacings are more suitable to control a more sharply bent portion of a curved heating element. However, it is desired to use a minimum number of insulator guides along the length of the mold consistent with a desire to guide the ribbon into an elongated curvature that conforms to the shape desired for the sharp line of bending to be imparted to the glass sheet to be treated.

The weight 61 attached to the free end of the ribbon 34 should be sufficiently heavy to tension the ribbon so that it remains out of contact with the upper surface of the glass sheet even when electric current causes the ribbon to expand thermally, yet not so heavy as to break the ribbon. A weight of approximately one pound (454 grams) is suitable for this invention.

The distance from the electroconductive heating element 34 to the glass sheet mounted on the shaping rail 68 of the outline mold should be as small as practically possible to insure a sharp line of bending and yet not so close as to have the heating element contact the glass. Generally, about ⅛ inch (3 mm) is the practical spacing that is sought.

The shaping rail is supported edgewise and has a serrated upper edge and apertures drilled throughout the length of the mold rail as is conventional in molds for supporting glass sheets during tempering. Upper edge serrations 1/16 inch (1.5 mm) wide and ¼ inch (6 mm) deep spaced ¼ inch (6 mm) apart were applied to the upper edge of the mold rail and holes 1-1/16 inch (27 mm) in diameter spaced on 2 inch (50 mm) centers were drilled along the length of the longitudinally extending rail portions. A typical mold rail is 2 inches (5 cm) high and ⅛ inch (3.2 mm) thick with the serrated upper edge tapered to a lesser thickness of 1/16 inch (1.6 mm) at its upper edge.

The glass pattern that required the bending apparatus just described was an elongated glass sheet bent in both the horizontal and vertical plane when installed in an automobile. The horizontal component of curvature was approximately ¾ inch (19 mm) from a straight line at its widest point and the vertical component of curvature or sag was about ½ inch (13 mm) measured from a straight edge. The part was made using SOLEX ® float glass having a nominal thickness of 3/16 inch (4.7 mm). The electroconductive heating element 34 was a curved nichrome ribbon (Tophet A) about 3/16 inch (4.7 mm) wide and 0.008 inch (0.2 mm) thick suspended about ⅛ inch (3.2 mm) over the flat glass.

Each sheet was preheated in a furnace for 30 seconds at an ambient temperature of about 1080° F. (582° C.) before the ribbon was energized. The furnace heating then continued as power was applied to the ribbon at 69 volts and 47 amperes for about 3½ minutes. The electric power was disconnected and the mold remained in the furnace for 30 seconds after the electric power was stopped in both the ribbon and the furnace. The heated sheet was then moved rapidly to a quenching station where cold air at room temperature was applied at 45 ounces per square inch (0.19 Kg./cm.$^2$) against the top surface and at 20 ounces per square inch (0.09 Kg./cm.$^2$) against the bottom surface.

Sharp curved lines of bending can also be applied to glass sheets by applying an electroconductive coating along the curved line of sharp bending and applying voltage through the length of the coating after the coated glass sheet is heated as in the case of the electroconductive ribbon closely spaced from the glass. The electroconductive material remains on the surface of the glass sheet after bending and tempering and may provide a "style line" if such is desired by the customer. If the "style line" is not desired, it is difficult to remove. Hence, the use of a curved flexible electroconductive ribbon is preferred over a coating type of electroconductive element.

The form of the invention shown and described in this specification represents an illustrative preferred embodiment and certain modifications thereof. It is understood that various changes may be made without departing from the gist of the invention as defined in the claimed subject matter that follows.

We claim:

1. Apparatus for producing a curved line of sharp bending across a heat-softened glass sheet, along which line the radius of curvature is no more than 8 inches, comprising:
    a bending mold including upwardly facing shaping surfaces defining the desired contour for the bent glass sheet, the uppermost extremities of the shaping surfaces defining a generally horizontal plane of support for a flat glass sheet;
    an elongated, flexible, electroconductive, electrical resistance heating element supported in a curved locus within a substantially horizontal plane slightly above said plane of flat glass support, and extending from one side of the bending mold to the opposite side;
    a plurality of support means suspended above said flexible heating element, spaced apart along said curved locus;
    a plurality of hanger means, each affixed to a respective one of said support means, for slidingly suspending the heating element and for guiding the heating element along said curved locus, and electrically insulated from the bending mold;
    means for applying tension along the length of the heating element so as to maintain the heating element taut between said hanger means; and
    means for supplying electrical energy to the heating element so as to radiate heat along a relatively narrow curved line across a glass sheet placed onto the bending mold.

2. The apparatus of claim 1 wherein said hanger means comprise U-shaped wire members affixed at their upper ends to said support means.

3. The apparatus of claim 2 wherein each of said support means comprises a body of electrical insulation material directly overlying said curved locus of the heating element.

4. The apparatus of claim 3 wherein said heating element is a flexible ribbon and each of said hanger means and respective support means define a narrow slot within which said ribbon may slide.

* * * * *